United States Patent
Tsutsumi et al.

(10) Patent No.: US 6,645,671 B2
(45) Date of Patent: Nov. 11, 2003

(54) LITHIUM SECONDARY BATTERY, ANODE FOR LITHIUM SECONDARY BATTERY, AND METHOD FOR MANUFACTURING THE ANODE

(75) Inventors: Masami Tsutsumi, Kawasaki (JP); Hiroshi Horiuchi, Kawasaki (JP); Tamotsu Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 124 days.

(21) Appl. No.: 09/840,184

(22) Filed: Apr. 24, 2001

(65) Prior Publication Data
US 2001/0031396 A1 Oct. 18, 2001

Related U.S. Application Data

(63) Continuation of application No. PCT/JP99/06506, filed on Nov. 19, 1999.

(30) Foreign Application Priority Data

Dec. 11, 1998 (JP) .............................. 10-353249

(51) Int. Cl.$^7$ ................................ H01M 4/62
(52) U.S. Cl. ................... 429/212; 429/231.95
(58) Field of Search ................... 429/212, 231.95, 429/231.8

(56) References Cited

U.S. PATENT DOCUMENTS 5,540,741 A  * 7/1996 Gozdz ...................... 29/623.5
5,580,681 A  * 12/1996 Fleischer .................. 429/192
5,665,212 A  * 9/1997 Zhong ....................... 304/297
5,998,065 A  * 12/1999 Tsutsumi et al.
6,114,062 A  * 9/2000 Motomura et al.

FOREIGN PATENT DOCUMENTS

| DE | 198 46 408 A1 | 4/1999 | |
| JP | 9-129240 | 5/1997 | |
| JP | 10-261435 | * 9/1998 | .......... H01M/10/40 |
| JP | 10-294129 | 11/1998 | |

* cited by examiner

*Primary Examiner*—Mark Ruthkosky
(74) *Attorney, Agent, or Firm*—Armstrong, Westerman & Hattori, LLP

(57) ABSTRACT

A lithium secondary battery comprises a cathode 1 capable of charging and discharging lithium ions, an anode 2 formed from a material which can be doped and de-doped with lithium ions, lithium metal, or the like, and an electrolyte that allows the movement of lithium ions. The anode 2 contains an imide compound represented by the chemical formula below.

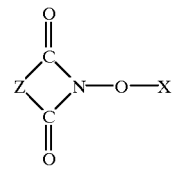

In the chemical formula above, Z is an optionally substituted —$(CH_2)_n$— (where n is an integer from 2 to 7), 1,2-cyclohexylene or 1,2-phenylene; X is a hydrogen atom, or an optionally substituted alkyl group, aralkylcarbonyl group, alkylcarbonyl group, alkoxycarbonyl group, aralkyloxycarbonyl group, or imidyloxycarbonyl group.

9 Claims, 4 Drawing Sheets

LITHIUM SECONDARY BATTERY, ANODE FOR LITHIUM SECONDARY BATTERY, AND METHOD FOR MANUFACTURING THE ANODE

This application is a continuation of international application PCT/JP/99/06506 filed Nov. 19, 1999.

TECHNICAL FIELD

The present invention relates to a lithium secondary battery used as a power source for memory retention in electronic equipment, a power source for driving portable electronic equipment, or the like, to an anode for a lithium secondary battery, and to a method for manufacturing the anode.

BACKGROUND ART

In recent years, lithium batteries which have lithium salts as electrolytic components have attracted attention since such batteries give a high energy density at a high voltage (3 to 4V), and such batteries have been developed to the extent that they can be used in practical applications. In order to make personal computers, word processors, portable telephones and the like yet more portable, it will be necessary in the future to make lithium batteries into the form of rechargeable secondary batteries and to further improve cycle characteristics (charging efficiency, cycle life, etc.).

A lithium secondary battery has a cathode capable of charging and discharging lithium ions, an anode comprising a material which may be doped and de-doped with lithium ions, lithium metal or the like, and an electrolyte that allows migration of lithium ions. A nonaqueous electrolytic solution in which a lithium salt is dissolved in an organic solvent is generally used as the electrolyte.

However, with lithium metal batteries that use metallic lithium or a lithium alloy as an anode active substance, the electrolytic solution has a tendency to decompose due to reaction between the organic solvent in the electrolytic solution and the anode active substance. There is thus a problem that good cycle characteristics cannot be obtained with lithium metal batteries that use an electrolytic solution containing an organic solvent.

The invention disclosed in JP-A-10-261435 attempts to solve this problem. The invention in this document attempts to suppress the reaction between the organic solvent and the anode active substance by adding an imide compound to the electrolytic solution. This method certainly gives good results with 'coin-shaped' batteries. However, with cylindrical batteries it is difficult to put in a large quantity of the electrolytic solution, meaning that it is difficult to put in a large quantity of the imide compound. With the method disclosed in the above-mentioned publication, it is thus difficult to sufficiently suppress the reaction between the organic solvent and the anode active substance in the case of a cylindrical lithium metal battery.

One of the problems with lithium secondary batteries is thus that good cycle characteristics cannot be obtained for a variety of different battery forms.

An object of the present invention is to solve this problem.

DISCLOSURE OF THE INVENTION

The present invention provides, as a first aspect, a lithium secondary battery that comprises a cathode capable of charging and discharging lithium ions, an anode containing a material which can be doped and de-doped with lithium ions, lithium metal, or a lithium alloy, and an electrolyte that allows migration of lithium ions, wherein the aforementioned anode also contains an imide compound.

Imide compounds have a strong ability to coordinate with metal ions. It is thought that in an electrolyte containing an organic solvent and lithium ions, the imide compound coordinates with the lithium ions more quickly and more strongly than the organic solvent coordinates with the lithium ions, so that the imide compound exists in the form of coordination complex with the lithium ions. It can thus be envisaged that, even if an electrolyte containing an organic solvent is used, reaction between the organic solvent and the anode (the anode active substance) is suppressed due to the presence of the imide compound(s) in the lithium secondary battery of the present invention. Consequently, reaction between the organic solvent and the anode active substance can be adequately avoided and the cycle characteristics of the lithium secondary battery improved, regardless of whether the lithium secondary battery has a coin-shaped form or a cylindrical form.

Lithium secondary batteries can broadly be categorized into lithium metal secondary batteries and lithium ion secondary batteries. The technical ideas of the present invention can be applied to either type of lithium secondary battery.

In the lithium metal secondary battery of the present invention, the cathode is, for example, composed of a mixture comprising a cathode active substance that is capable of occluding and releasing lithium ions, a conductant agent that has the function of supplementing the conductivity of the cathode, and a binder for binding the cathode active substance and the conductant agent together.

The above-mentioned cathode active substance is, for example, a macromolecular conductive material, a metal oxide, a metal sulfide, an inorganic conductive material, or the like.

Examples of the above-mentioned macromolecular conductive material include polyaniline, polyacetylene, poly-p-phenylene, polybenzene, polypyridine, polythiophene, polyfuran, polypyrrole, polyanthracene and polynaphthalene, along with derivatives of these macromolecular compounds.

Examples of the above-mentioned metal oxide include manganese dioxide, vanadium pentoxide, molybdenum trioxide, chromium trioxide and cupric oxide.

Examples of the above-mentioned metal sulfide include molybdenum disulfide, titanium disulfide and iron disulfide.

Examples of the above-mentioned inorganic conductive material include fluorocarbons.

The above-mentioned conductant agent is, for example, acetylene black, graphite, carbon, or the like.

The above-mentioned binder is, for example, Teflon resin, an ethylene-propylene-diene terpolymer, or the like.

The anode used in the lithium metal secondary battery of the present invention comprises, for example, an anode active substance and an imide compound.

The above-mentioned anode active substance is, for example, metallic lithium or a lithium alloy. In the anode, the anode active substance is in the form, for example, of foil or a plate.

An example of the above-mentioned lithium alloy is an alloy of metallic lithium and at least one metal selected from the group consisting of metals such as aluminum, magnesium, indium, mercury, zinc, cadmium, lead, bismuth, tin and antimony.

Specific examples of the above-mentioned lithium alloy include a lithium-aluminum alloy, a lithium-tin alloy and a lithium-lead alloy.

Examples of the above-mentioned imide compound are compounds represented by undermentioned general formula (1).

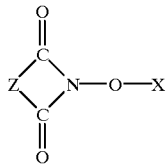

(1)

Here, Z is an optionally substituted —$(CH_2)_n$— (where n is an integer from 2 to 7), 1,2-cyclohexylene, or 1,2-phenylene. X is a hydrogen atom, or an optionally substituted alkyl group, aralkylcarbonyl group, alkylcarbonyl group, alkoxycarbonyl group, aralkyloxycarbonyl group, or imidyloxycarbonyl group.

'—$(CH_2)_n$— (where n is an integer from 2 to 7)' in the definition of Z includes alkylene radicals such as ethylene, trimethylene, tetramethylene, pentamethylene, hexamethylene and heptamethylene. n is preferably 2 or 3.

Possible substituents in the definition of Z include lower alkyl groups, lower alkoxy group, and residues that can form a cyclic imide with the atoms that make up Z.

In view of the above, Z is preferably ethylene, trimethylene, 1,2-cyclohexylene, 1,2-cyclopentylene or 1,2-phenylene, and out of these most preferably ethylene or 1,2-phenylene.

The alkyl group in the definition of X may be either a straight chain alkyl group or a branched alkyl group, and preferably contains 1 to 20 carbon atoms, more preferably 1 to 6 carbon atoms.

Examples of the above-mentioned straight chain alkyl group include methyl, ethyl, propyl, butyl, pentyl, heptyl, octyl, nonyl, decyl, undecyl, dodecyl, tridecyl, tetradecyl, pentadecyl, hexadecyl, heptadecyl, octadecyl, nonadecyl and icosyl.

Examples of the above-mentioned branched alkyl group include isopropyl, methylpropyl, methylbutyl, methylpentyl, methylheptyl, methyloctyl, methylnonyl, methyldecyl, methylundecyl, methyldodecyl, methyltridecyl, methyltetradecyl, methylpentadecyl, methylhexadecyl, methylheptadecyl, methyloctadecyl and methylnonadecyl.

An example of the aralkylcarbonyl group in the definition of X is an alkylcarbonyl group containing 1 to 6 carbon atoms that is substituted with an aryl group such as phenyl or naphthyl.

Specific examples of the above-mentioned aralkylcarbonyl group include benzylcarbonyl, phenethylcarbonyl, phenylpropylcarbonyl, phenylbutylcarbonyl, phenylpentylcarbonyl and phenylhexylcarbonyl.

The alkylcarbonyl group in the definition of X may be either a straight chain alkylcarbonyl group or a branched alkylcarbonyl group, and preferably contains 1 to 20 carbon atoms, more preferably 1 to 6 carbon atoms.

Examples of the above-mentioned straight chain alkylcarbonyl group include acetyl, ethanoyl, propanoyl, butanoyl, pentanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, nonadecanoyl and icosanoyl.

Examples of the above-mentioned branched alkylcarbonyl group include isopropanoyl, methylpropanoyl, methylbutanoyl, methylpentanoyl, methylheptanoyl, methyloctanoyl, methylnonanoyl, methyldecanoyl, methylundecanoyl, methyldodecanoyl, methyltridecanoyl, methyltetradecanoyl, methylpentadecanoyl, methylhexadecanoyl, methylheptadecanoyl, methyloctadecanoyl and methylnonadecanoyl.

The alkoxycarbonyl group in the definition of X may be either a straight chain alkoxycarbonyl group or a branched alkoxycarbonyl group, and preferably contains 1 to 20 carbon atoms, more preferably 1 to 6 carbon atoms.

Examples of the above-mentioned straight chain alkoxycarbonyl group include methoxycarbonyl, ethoxycarbonyl, propoxycarbonyl, butoxycarbonyl, pentoxycarbonyl, heptoxycarbonyl, octoxycarbonyl, nonoxycarbonyl, decoxycarbonyl, undecoxycarbonyl, dodecoxycarbonyl, tridecoxycarbonyl, tetradecoxycarbonyl, pentadecoxycarbonyl, hexadecoxycarbonyl, heptadecoxycarbonyl, octadecoxycarbonyl, nonadecoxycarbonyl and icosoxycarbonyl.

Examples of the above-mentioned branched alkoxycarbonyl group include isopropoxycarbonyl, methylpropoxycarbonyl, methylbutoxycarbonyl, methylpentoxycarbonyl, methylheptoxycarbonyl, methyloctoxycarbonyl, methylnonoxycarbonyl, methyldecoxycarbonyl, methylundecoxycarbonyl, methyldodecoxycarbonyl, methyltridecoxycarbonyl, methyltetradecoxycarbonyl, methylpentadecoxycarbonyl, methylhexadecoxycarbonyl, methylheptadecoxycarbonyl, methyloctadecoxycarbonyl and methylnonadecoxycarbonyl.

An example of the aralkyloxycarbonyl group in the definition of X is an alkoxycarbonyl group containing 1 to 6 carbon atoms that is substituted with an aryl group such as phenyl or naphthyl.

Specific examples of the above-mentioned aralkyloxycarbonyl group include benzyloxycarbonyl, phenethyloxycarbonyl, phenylpropyloxycarbonyl phenylbutyloxycarbonyl, phenylpentyloxycarbonyl and phenylhexyloxycarbonyl.

Examples of the imidyloxycarbonyl group in the definition of X include succinimidyloxycarbonyl and phthalimidyloxycarbonyl.

Out of the examples given for X, particularly preferable ones are a hydrogen atom, alkoxycarbonyl groups containing 1 to 6 carbon atoms, and aralkyloxycarbonyl groups for which the alkyl part contains 1 to 6 carbon atoms.

Examples of the substituents in the definition of X include lower alkyl groups, lower alkoxy groups, and a succinimidoxycarbonyloxy group.

In summary, imide compound(s) of the above-mentioned chemical formula (1) are preferably used, in which Z is ethylene(succinimide type compound) or 1,2-phenylene (phthalimide type compound), and X is a hydrogen atom, an alkoxycarbonyl group containing 1 to 6 carbon atoms, or an aralkyloxycarbonyl group for which the alkyl part contains 1 to 6 carbon atoms.

More specifically, a preferable choice for one of the above-mentioned imide compound(s) is a compound represented by undermentioned chemical formula (2) or (3).

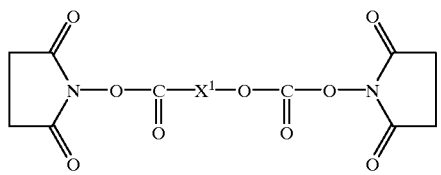

(2)

In above-mentioned chemical formula (2), $X^1$ is optionally substituted $-(CH_2)_n-$ (where n is an integer from 2 to 20), 1,2-cyclohexylene, or 1,2-phenylene.

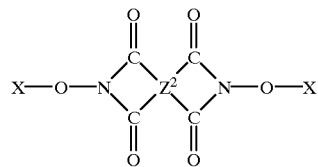

(3)

In above-mentioned chemical formula (3), each X is the same as X in above-mentioned chemical formula (1), and $Z^2$ is phenyl tetrayl, binaphthyl tetrayl, isopropylidene diphenyl tetrayl, hexafluoroisopropylidene diphenyl tetrayl, diphenyl ether tetrayl, diphenyl ketone tetrayl or diphenyl sulfone tetrayl.

Specific examples of the above-mentioned imide compound(s) include those represented by undermentioned chemical formulae (A) to (G). Specifically, N-hydroxyphthalimide (undermentioned chemical formula (A)), N-hydroxysuccinimide (undermentioned chemical formula (B)) N,N-disuccinimidyl carbonate (undermentioned chemical formulae (C)), 1,5-bis(succinimidoxycarbonyloxy)pentane (undermentioned chemical formula (D)), 9-fluorenylmethyl-N-succinimidyl carbonate (undermentioned chemical formula (E)), N-(benzyloxycarbonyloxy)succinimide (undermentioned chemical formula (F)), and Z-glycine-N-succinimidyl ester (undermentioned chemical formula (G)), are preferable choices for the above-mentioned imide compound(s).

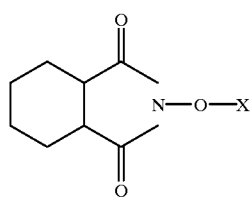

(A)

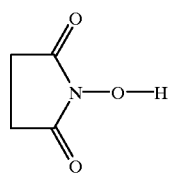

(B)

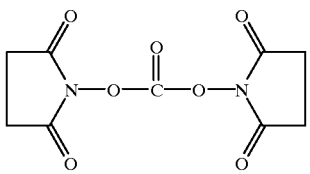

(C)

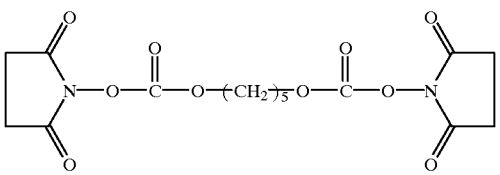

(D)

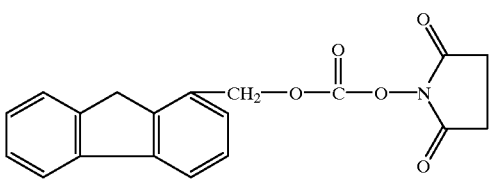

(E)

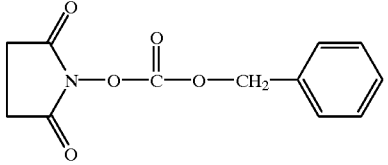

(F)

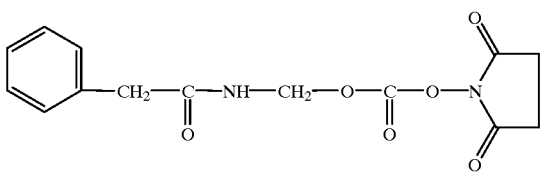

(G)

The imide compound content in the anode is made to be in the range 1 to 30 wt % relative to the total weight of the anode. This is because, if the imide compound content is too low, then it will not be possible to sufficiently improve the cycle characteristics (charging/discharging efficiency, cycle life, etc.) of the lithium secondary battery, whereas if the imide compound content is too high, then the proportion of the anode active substance in the anode will be unreasonably low. In order to obtain even better results, the imide compound content is made to be in the range 5 to 20 wt %.

When the electrolyte used is in the form of an electrolytic solution, the one or more electrolytic components are dissolved in an organic solvent.

The electrolytic component used in the above-mentioned electrolyte can be any of those commonly used in the technical field in question, for example lithium salt. The lithium salt used as the electrolytic component in the lithium secondary battery of the present invention may be either an inorganic salt or organic salt.

Examples of the above-mentioned inorganic salt include $LiPF_6$, $LiClO_4$, $LiAsF_6$, $LiAlCl_4$, $LiBF_4$, LiCl and LiBr.

Examples of the above-mentioned organic salt include $CH_3SO_3Li$, $CF_3SO_3Li$, $LiB(C_6H_5)_4$ and $CF_3COOLi$.

The lithium salts given as examples here may either be used alone or a plurality may be used in combination.

The organic solvent used can be a publicly-known solvent (for example a high-permittivity solvent or a low-viscosity solvent) used in the technical field in question.

An example of the above-mentioned high-permittivity solvent is a cyclic carbonate having 3 to 5 carbon atoms. Examples of such a cyclic carbonate having 3 to 5 carbon atoms include ethylene carbonate (EC), propylene carbonate (PC) and butylene carbonate (BC).

Examples of the above-mentioned low-viscosity solvent include a linear carbonate having 3 to 9 carbon atoms, a linear ether, an ester, and an aromatic hydrocarbon.

Examples of the above-mentioned linear carbonate having 3 to 9 carbon atoms include dimethyl carbonate (DMC), diethyl carbonate (DEC), dipropyl carbonate (DPC) and methyl ethyl carbonate (MEC).

Examples of the above-mentioned linear ether include 1,2-dimethoxyethane (DME), 1,2-diethoxyethane (DEE) and 1,2-dibutoxyethane (DBE).

Examples of the above-mentioned ester include cyclic ethers such as tetrahydrofuran (THF) and 2-methyltetrahydrofuran (2-MeTHF), methyl formate, methyl acetate, and methyl propenoate.

Examples of the above-mentioned aromatic hydrocarbon include benzene (Bz), toluene and xylene.

The above-mentioned high-permittivity solvents and low-viscosity solvents may either be used alone or a plurality may be used in combination. Note, however, that if low-viscosity solvent is used as the above-mentioned organic solvent, then it is preferable to use this low-viscosity solvent in combination with high-permittivity solvent in order to compensate for the low charging/discharging efficiency of the low-viscosity solvent.

Possible combinations of the above-mentioned high-permittivity solvents and low-viscosity solvents include 2-component solvent systems such as EC-DMC, EC-DEC, PC-DMC, PC-DEC and PC-MEC, 3-component solvent systems such as EC-DMC-Bz, EC-DEC-Bz, PC-DMC-Bz, PC-DEC-Bz, EC-PC-DMC and EC-PC-DEC, and 4-component solvent systems such as EC-PC-DMC-Bz and EC-PC-DEC-Dz.

The ratio of high-permittivity solvent to low-viscosity solvent (by volume) is made to be, for example, 1:4 to 2:1, preferably 1:2 to 1:1.

The above-mentioned electrolyte may also be in the form of a solid electrolyte. Examples of such a solid electrolyte include polyacrylonitrile, poly vinylidene fluoride, photocured polymerizable monomers consisting of ethoxydiethyl glycol acrylate and trimethylolpropane triacrylate, and polyphosphazenes.

On the other hand, when the lithium secondary battery is made to be in the form of a lithium ion secondary battery, the cathode is, for example, composed of a mixture of a cathode active substance, conductant agent and binder.

Examples of the above-mentioned cathode active substance include lithium mixed metal oxides represented by the general formula $Li_p(MO_2)_q$ (where M is at least one metal selected from cobalt, nickel and manganese; p and q are integers satisfying the valencies), and intercalation compounds containing lithium such as $LiCoO_2$, $LiNiO_2$, $LiMn_2O_4$ and $LiMn_3O_6$.

The above-mentioned conductant agent and binder can be just like the conductant agent and binder used in the cathode of the lithium metal secondary battery.

The above-mentioned anode is, for example, composed of a mixture comprising an anode active substance, an imide compound, a conductant agent and a binder.

A carbon material is preferably used as the above-mentioned anode active substance. Examples of such a carbon material include graphite, a conjugated resin, a fused polycyclic hydrocarbon, and a furan resin.

Examples of the above-mentioned conjugated resin include phenolic resins, acrylic resins, polyimide resins and polyamide resins.

Examples of the above-mentioned fused polycyclic hydrocarbon include naphthalene, phenanthrene and anthracene.

Examples of the above-mentioned furan resin include a homopolymer of furfuryl alcohol, a homopolymer of furfural, and a copolymer of furfuryl alcohol and furfural.

A material obtained by baking/carbonizing an organic material such as oxygen-bridged petroleum pitch can also be used as a carbon material.

The carbon materials given as examples here may either be used alone or a plurality may be used in mixture. Use of graphite is particularly preferable.

The imide compound used in the anode of the above-mentioned lithium ion secondary battery can be just like the imide compound used in the anode of the above-mentioned lithium metal secondary battery. Furthermore, the conductant agent and binder used in the anode of the above-mentioned lithium ion secondary battery can be just like the conductant agent and binder used in the cathode of the above-mentioned lithium metal secondary battery.

Moreover, in both the above-mentioned lithium metal secondary battery and the above-mentioned lithium ion secondary battery, a separator or separators may be provided between the cathode and the anode in order to retain the electrolyte and prevent short-circuiting between the cathode and the anode. There are no particular limitations on the separator material provided it is an easily processable insulating material that is not dissolved by the electrolyte. Specific examples of the separator material include porous polypropylene and porous polyethylene.

In both the above-mentioned lithium metal secondary battery and the above-mentioned lithium ion secondary battery, the cathode and/or the anode may be formed on a collector comprising a metal such as aluminum or copper.

The lithium secondary battery of the present invention can be cylindrical, rectangular, coin-shaped (button-shaped) or sheet-shaped.

In a second aspect of the present invention, an anode used in a lithium secondary battery is provided. The lithium secondary battery anode provided in the second aspect of the present invention is characterized by comprising an anode active substance and at least one kind of imide compound.

Examples of the above-mentioned anode active substance are as described in the above-mentioned first aspect of the present invention. Specifically, examples of the above-mentioned anode active substance include lithium and alloys thereof, and materials which can be doped and de-doped with lithium ions is possible (for example carbon materials).

As the above-mentioned imide compound, those given as examples of the imide compounds included in the anode in the above-mentioned first aspect of the present invention are preferably used. In particular, it is preferable to use at least one selected from the group consisting of N-hydroxyphthalimide, N-hydroxysuccinimide, N,N-disuccinimidyl carbonate, 1,5-bis (succinimidoxycarbonyloxy)pentane, 9-fluorenylmethyl-N-succinimidyl carbonate, N-(benzyloxycarbonyloxy) succinimide, and Z-glycine-N-succinimidyl ester.

The imide compound content in the anode is made to be in the range 1 to 30 wt % relative to the total weight of the anode, more preferably in the range 5 to 20 wt %.

In a third aspect of the present invention, a manufacturing method for the lithium secondary battery anode described in the above-mentioned second aspect of the present invention is provided.

A first method of the above-mentioned manufacturing method is a manufacturing method for a lithium secondary battery anode that comprises an anode active substance and an imide compound, wherein this first method is characterized in that an organic solvent in which the above-mentioned imide compound has been dissolved is applied onto the above-mentioned anode active substance, and then this organic solvent is evaporated.

With this first method, an anode having a multilayer structure consisting of anode active substance layers and imide compound layers is easily provided. The anode having a multilayer structure is formed, for example, by applying the imide compound onto a piece of anode active substance that is in the form of foil or a plate, and then further placing another piece of anode active substance that is in the form of foil or the like on top of the imide compound layer. When forming this anode, further imide compound layers and anode active substance layers may of course be built up, and moreover the resulting layered structure may be rolled to a desired thickness.

The organic solvent used in the above-mentioned first method can be just like the organic solvent used when making the electrolyte into the form of an electrolytic solution in the lithium secondary battery described in the first aspect of the present invention. Out of the examples given for this organic solvent, it is preferable to use dimethyl carbonate (DMC) as the organic solvent in the above-mentioned first method.

A second method of the above-mentioned manufacturing method is a manufacturing method for a lithium secondary battery anode that comprises an anode active substance and an imide compound, wherein this second method is characterized in that the anode active substance is heated together with the imide compound and melted, thus dispersing the imide compound in the anode active substance.

A third method of the above-mentioned manufacturing method is a manufacturing method for a lithium secondary battery anode that comprises an anode active substance and an imide compound, wherein this third method is characterized in that the above-mentioned anode is formed by extrusion molding an ingot comprising the anode active substance, and when doing this applying the imide compound onto the surface of the ingot.

The imide compound may be applied onto the ingot by dissolving the imide compound in an organic solvent and then spraying the resulting solution, or by directly applying the imide compound in powder form. The organic solvent used in the third method can be just like the organic solvent used in the above-mentioned first method.

BEST MODE FOR CARRYING OUT THE INVENTION

Figure 1:
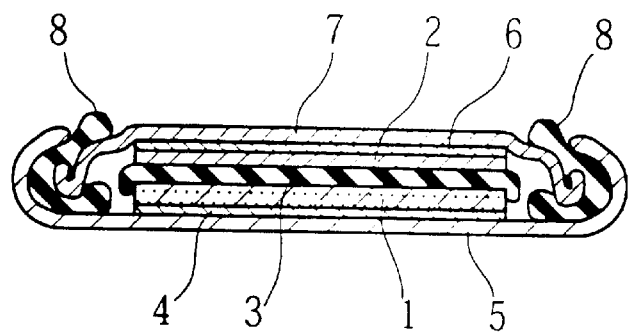
FIG. 1 is a cross-sectional view showing the structure of a coin-shaped lithium secondary battery, which is a typical example of a lithium secondary battery to which the present invention can be applied.

The coin-shaped lithium secondary battery shown in FIG. 1 has: a cathode 1 having, for example, $LiCoO_2$ (lithium cobaltate) as the active material; an anode 2 comprising, for example, lithium foil; and a separator 3 positioned between the cathode 1 and the anode 2 and comprising, for example, a porous polypropylene film.

The cathode 1 is formed on a cathode collector 4 that is made, for example, from aluminum. This cathode collector 4 is fixed to the inner surface of a cathode casing 5 that is made, for example, from stainless steel.

In accordance with the present invention, the anode 2 contains an imide compound. The anode 2 is formed on an anode collector 6 that is made, for example, from aluminum. This anode collector 6 is fixed to the inner surface of an anode casing 7 that is made, for example, from stainless steel.

The space between the cathode casing 5 and the anode casing 7, in addition to containing the cathode 1 and the anode 2, is also filled with a nonaqueous electrolytic solution (not shown in FIG. 1). This nonaqueous electrolytic solution is prepared, for example, by dissolving $LiPF_6$ (lithium hexafluorophosphate) in a mixed organic solvent consisting of ethylene carbonate (EC) and dimethyl carbonate (DMC).

The coin-shaped lithium secondary battery of the present invention is completed by using packing 8 made, for example, from polypropylene to seal between the peripheral part of the cathode casing 5 and the peripheral part of the anode casing 7, and thus fix the anode casing 7 to the cathode casing 5.

Note that the cathode collector 4 does not necessarily have to be fixed to the inner surface of the cathode casing 5, and the anode collector 6 does not necessarily have to be fixed to the inner surface of the anode casing 7. For example, the set consisting of the cathode 1, the anode 2, the separator 3, the cathode collector 4 and the anode collector 6 may have a structure in which the cathode collector 4 (or anode collector 6) is pushed against the cathode casing 5 (or anode casing 7), with a disc spring or the like being placed between the collector 4 (or 6) and the electrode casing 5 (or 7).

Figure 2:
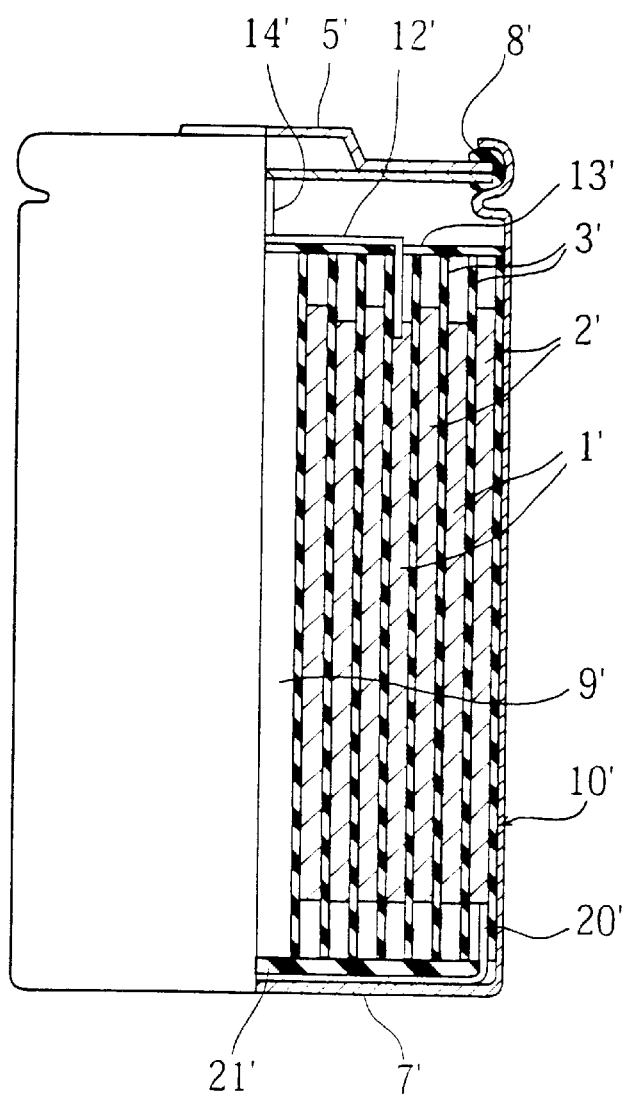
FIG. 2 is a half section showing the structure of a cylindrical lithium secondary battery, which is another typical example of a lithium secondary battery to which the present invention can be applied.

The cylindrical lithium secondary battery shown in FIG. 2 is similar to the coin-shaped lithium battery, in that this cylindrical lithium secondary battery has: a cathode 1' having, for example, $LiCoO_2$ (lithium cobaltate) as the active material; an anode 2' comprising, for example, lithium foil; and separators 3' which are positioned between the cathode 1' and the anode 2' and comprise, for example, a porous polypropylene film.

Figure 3:
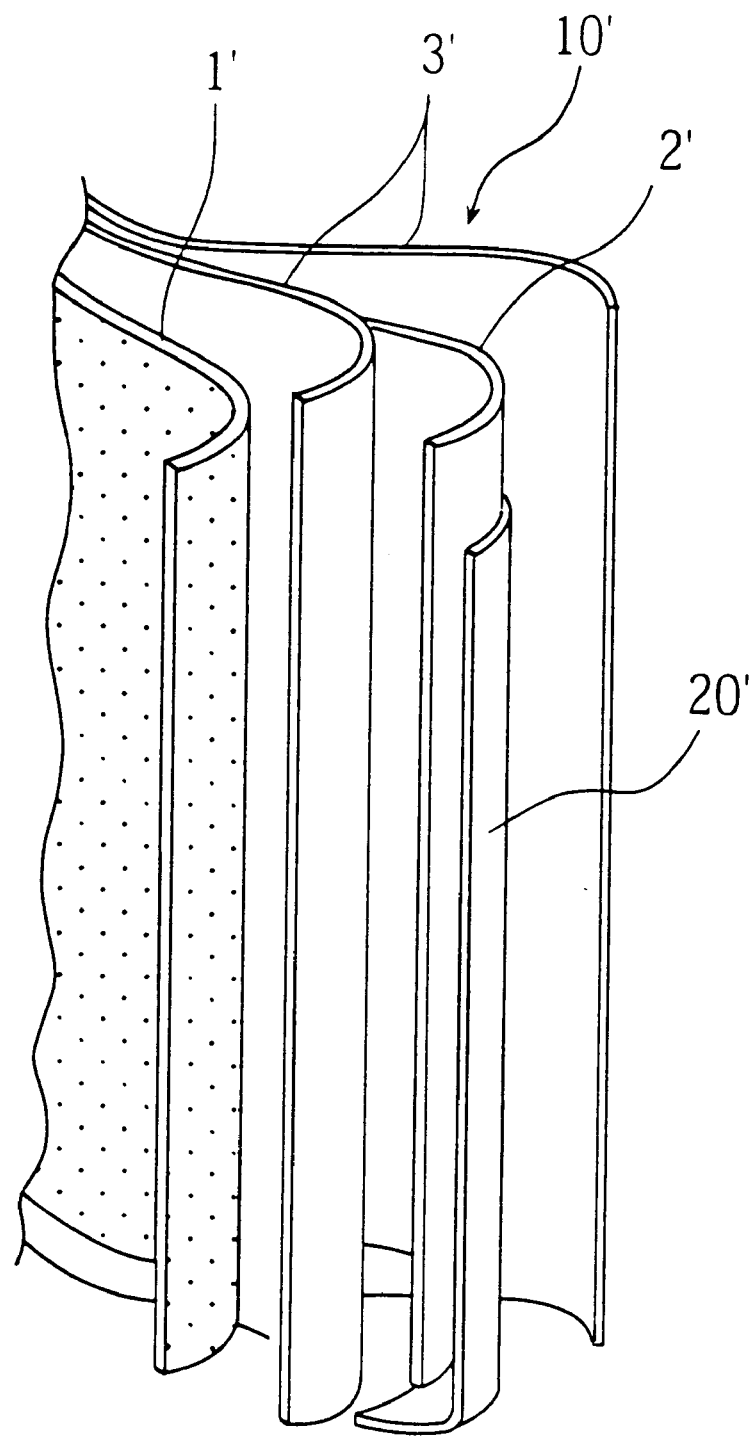
FIG. 3 is a perspective view of a fragment of the cathode/anode/separator layered structure used in the cylindrical lithium secondary battery of FIG. 2, with the various layers being shown spread out from one another.

As shown in FIG. 3, the cathode 1', the anode 2' and the separators 3' make up a layered structure 10'. As shown in FIG. 2, this layered structure 10' is in the form of a long strip that is wound around a center pin 9' and housed in a cylindrical anode casing 7' that is made, for example, from stainless steel.

The cathode 1' is formed by applying a cathode mixture onto each side of, for example, a piece of aluminum foil that serves as the cathode collector and then rolling (this structure is not shown in FIGS. 2 and 3). As shown in FIG. 2, the cathode 1' is electrically connected to a cathode lead tab 12'. This cathode lead tab 12' passes through an upper insulating plate 13', and is electrically connected to a cathode cap 5' via a cathode lead pin 14'.

The anode 2' has a structure in which, for example, a piece of copper foil that serves as the anode collector is sandwiched from either side by lithium foil, which is the anode active substance (this structure is not shown in FIGS. 2 and 3). In accordance with the present invention, the anode 2' contains an imide compound. As shown in FIG. 2, the anode 2' is electrically connected to an anode lead tab 20'. This anode lead tab 20' goes past a lower insulating plate 21', and is connected to the inner surface of the base of the anode casing 7'.

The space between the cathode cap 5' and the anode casing 7', in addition to containing the wound layered structure 10', is also filled with, for example, a nonaqueous electrolytic solution. This nonaqueous electrolytic solution is prepared, for example, by dissolving $LiPF_6$ (lithium hexafluorophosphate) in a mixed organic solvent consisting of ethylene carbonate (EC) and dimethyl carbonate (DMC).

The cylindrical lithium secondary battery of the present invention is completed by using packing 8' made, for example, from polypropylene to seal between the peripheral part of the cathode cap 5' and the top part of the anode casing 7'.

Embodiments

Following is a description of embodiments of the present invention along with comparative examples.

[Embodiment 1]

Figure 4:
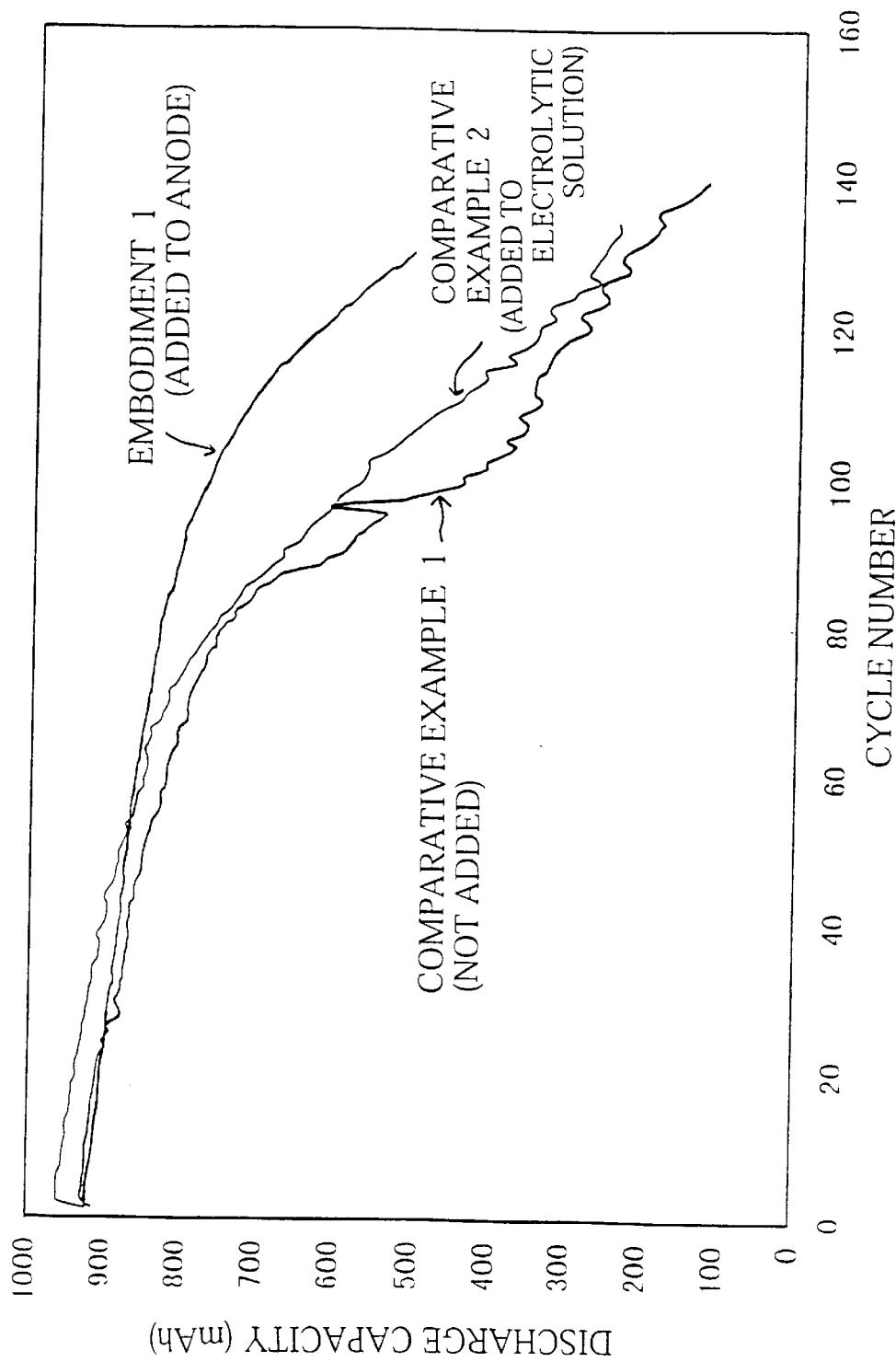
FIG. 4 is a graph showing the charging/discharging behavior for the cylindrical lithium secondary batteries of Embodiment 1, Comparative Example 1 and Comparative Example 2.

In this embodiment, a size AAA cylindrical lithium secondary battery having the structure shown in FIG. 2 was produced using the cathode, anode and electrolytic solution specified below. The charging/discharging behavior and cycle life of this cylindrical lithium secondary battery were then evaluated. The evaluation results for the charging/discharging behavior are shown in FIG. 4, while the evaluation results for the cycle life are shown in Table 1.

(Cathode)

The cathode 1' was formed by mixing homogenously 90 wt % of $LiCoO_2$ (lithium cobaltate) as the cathode active substance, 2.5 wt % of acetylene black and 2.5 wt % of graphite as conductant agents, and 5 wt % of polyvinylidene fluoride (PVDF) resin as a binder, and then applying the mixture so obtained onto either side of a piece of aluminum foil (cathode collector) and rolling.

(Anode)

Figure 5:
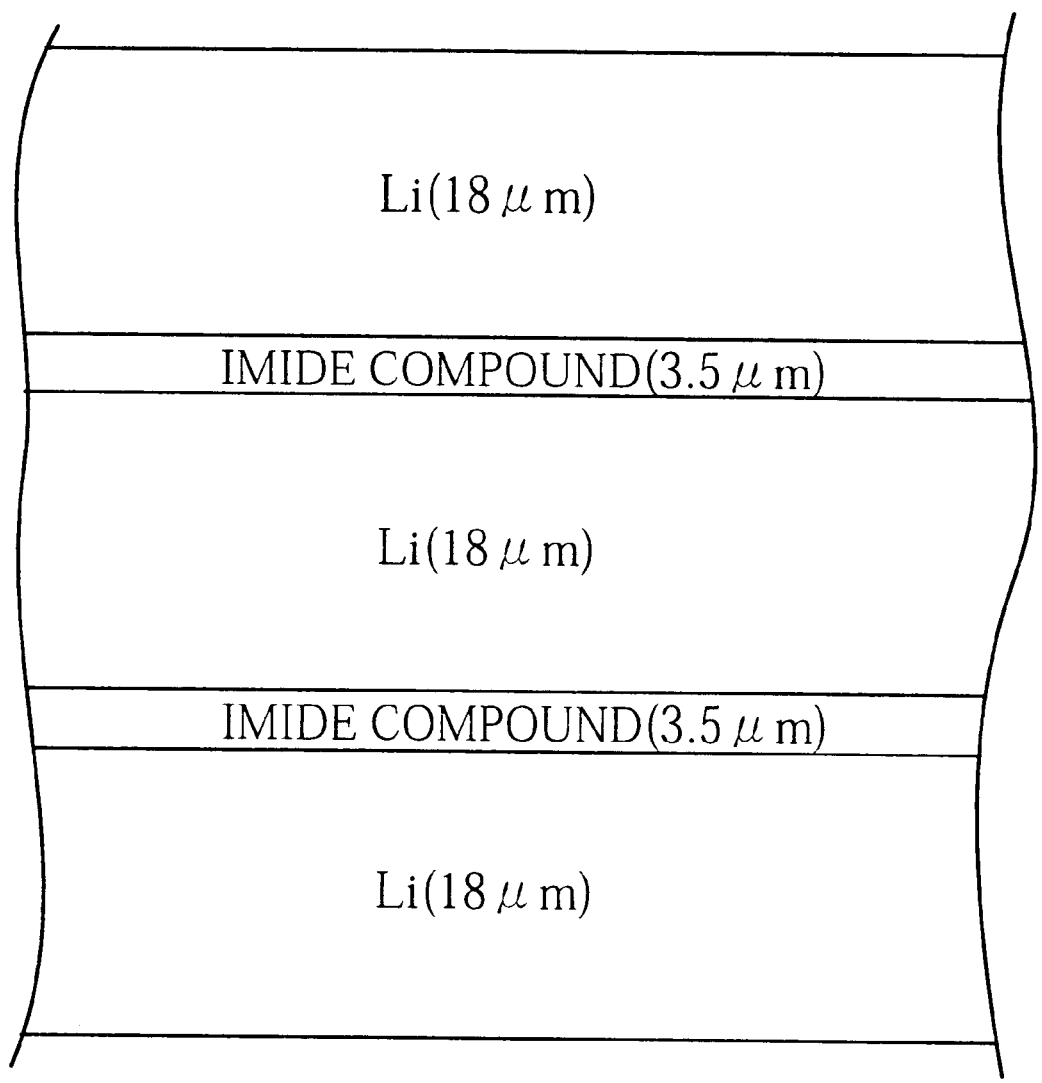
FIG. 5 is a cross-sectional view which explains the structure of the anode of the cylindrical lithium secondary batteries of the various embodiments and comparative examples through an enlargement of the important part.

The anode 2' was made by applying the imide compound Z-glycine-N-succinimidyl ester onto a piece of lithium foil (anode active substance), and then further building up in order another piece of lithium foil, another layer of the imide compound, and finally another piece of lithium foil. The resulting structure is shown in FIG. 5.

The imide compound content in the anode was made to be 10 wt %. By rolling the layered structure, the thicknesses of the lithium film layers and the imide compound layers were made to be 18 $\mu$m and 3.5 $\mu$m respectively.

(Electrolytic Solution)

The electrolytic solution used was a 1M solution of $LiPF_6$ (lithium hexafluorophosphate) in a mixed organic solvent consisting of ethylene carbonate (EC) and dimethyl carbonate (DMC) in the ratio 1:2.

(Evaluation of Charging/Discharging Behavior)

When measuring the charging/discharging behavior, charging and discharging were carried out between a 4.2V charged state and a 3.0V discharged state using a charging current density of 0.3 mA/cm$^2$ and a discharging current density of 1.0 mA/cm$^2$. The charging/discharging behavior was evaluated by measuring the electric capacity of the lithium metal secondary battery during the charging and discharging and plotting this electric capacity against the cycle number.

(Evaluation of Cycle Life)

The cycle life was evaluated when the discharge capacity was measured during the evaluation of the charging/discharging behavior, and was taken as the number of cycles taken for the discharge capacity to drop to 60% of the initial battery capacity.

Comparative Example 1

In this comparative example, a cylindrical lithium secondary battery was produced as in Embodiment 1, only an imide compound was not added to the anode. The charging/discharging behavior and cycle life of this cylindrical lithium secondary battery were evaluated using the method described above. The evaluation results for the charging/discharging behavior are shown in FIG. 4, while the evaluation results for the cycle life are shown in Table 1.

Comparative Example 2

In this comparative example, a cylindrical lithium secondary battery was produced by making the anode without adding an imide compound, but instead adding the imide compound Z-glycine-N-succinimidyl ester as the imide compound in an amount of 1 wt % to the electrolytic solution. The charging/discharging behavior of this cylindrical lithium secondary battery was measured using the method described above, and the cycle life was evaluated based on the measurement results for the charging/discharging behavior. The measurement results for the charging/discharging behavior are shown in FIG. 4, while the cycle life is shown in Table 1.

[Embodiments 2 to 7]

In each of Embodiments 2 to 7, a cylindrical lithium secondary battery was produced as in Embodiment 1, only the imide compound shown in Table 1 was used when producing the anode. Specifically, N-hydroxyphthalimide was used as the imide compound in Embodiment 2, N-hydroxysuccinimide was used as the imide compound in Embodiment 3, N,N-disuccinimidyl carbonate was used as the imide compound in Embodiment 4, 1,5-bis(succinimidoxycarbonyloxy)pentane was used as the imide compound in Embodiment 5, 9-fluorenylmethyl-N-succinimidyl carbonate was used as the imide compound in Embodiment 6, and N-benzyloxycarbonyloxy succinimide was used as the imide compound in Embodiment 7.

For each of these cylindrical lithium secondary batteries, the cycle life was evaluated using the same method as for Embodiment 1. The evaluation results for the cycle life for Embodiments 2 to 7 are shown in Table 1.

Note that in each of Embodiments 2 to 7, the imide compound content in the anode was made to be 10 wt % relative to the total weight of the anode.

TABLE 1

CYCLE LIFE MEASUREMENT RESULTS

| | Imide compound | Cycle life |
|---|---|---|
| Embodiment 1 | Z-glycine-N-succinimidylester | 128 cycles |
| Com. Ex. 1 | None | 93 cycles |
| Com. Ex. 2 | Z-glycine-N-succinimidyl ester (added to electrolytic solution) | 103 cycles |
| Embodiment 2 | N-hydroxyphthalimide | 98 cycles |
| Embodiment 3 | N-hydroxysuccinimide | 97 cycles |
| Embodiment 4 | N,N-disuccinimidyl carbonate | 108 cycles |
| Embodiment 5 | 1,5-bis(succinimidoxycarbonyloxy)pentane | 101 cycles |
| Embodiment 6 | 9-fluorenylmethyl-N-succinimidyl carbonate | 103 cycles |
| Embodiment 7 | N-benzyloxycarbonyloxy)succinimide | 110 cycles |

It is clear from FIG. 4 that the lithium secondary battery of Embodiment 1 (imide compound Z-glycine-N-succinimidyl ester added to anode) has better charging/discharging behavior than the lithium secondary battery of Comparative Example 1 (imide compound not added at all) and the lithium secondary battery of Comparative Example 2 (imide compound added to electrolytic solution). Furthermore, it is clear from Table 1 that the lithium secondary battery of Embodiment 1 has a longer cycle life than the lithium secondary batteries of Comparative Examples 1 and 2.

Moreover, it can be seen from Table 1 that all of the lithium secondary batteries for which an imide compound other than Z-glycine-N-succinimidyl ester was used (i.e. Embodiments 2 to 7) have a longer cycle life than the lithium metal secondary battery for which no imide compound was added at all (Comparative Example 1).

What is claimed is:

1. A lithium secondary battery comprising: a cathode capable of charging and discharging lithium ions; an anode containing a material which can be doped and de-doped with a material selected from the group consisting of lithium ions, lithium metal, and a lithium alloy; and an electrolyte that allows the movement of lithium ions;

wherein said anode also contains an imide compound which is represented by the chemical formula below:

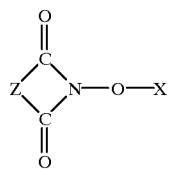

wherein Z is an optionally substituted —(CH$_2$)$_n$— (where n is an integer from 2 to 7), 1,2-cyclohexylene or 1,2-phenylene, and X is a hydrogen atom, oran optionally substituted alkyl group, aralkylcarbonyl group, alkylcarbonyl group, alkoxycarbonyl group, aralkyloxycarbonyl group or imidyloxycarbonyl group.

2. The lithium secondary battery according to claim 1, wherein said imide compound is at least one compound selected from the group consisting of N-hydroxyphthalimide, N-hydroxysuccinimide, N,N-disuccinimidyl carbonate, 1,5-bis(succinimidoxycarbonyloxy)pentane, 9-fluorenylmethyl-N-succinimidyl carbonate, N-(benzyloxycarbonyloxy)succinimide, and Z-glycine-N-succinimidyl ester.

3. The lithium secondary battery according to claim 1, wherein said imide compound is added in an amount of 1 to 30 wt %.

4. An anode for a lithium secondary battery, comprising an anode active substance and an imide compound which is presented by the chemical formula below:

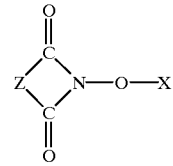

wherein Z is an optionally substituted —(CH$_2$)$_n$— (where n is an integer from 2 to 7), 1,2-cyclohexylene or 1,2-phenylene, and X is a hydrogen atom, or an optionally substituted alkyl group, aralkylcarbonyl group, alkylcarbonyl group, alkoxycarbonyl group, aralkyloxycarbonyl group, or imidyloxycarbonyl group.

5. The anode for a lithium secondary battery according to claim 4, wherein said imide compound is at least one compound selected from the group consisting of N-hydroxyphthalimide, N-hydroxysuccinimide, N,N-disuccinimidyl carbonate, 1,5-bis(succinimidoxycarbonyloxy)pentane, 9-fluorenylmethyl-N-succinimidyl carbonate, N-(benzyloxycarbonyloxy)succinimide, and Z-glycine-N-succinimidyl ester.

6. The anode for a lithium secondary battery according to claim 4, wherein said imide compound is added in an amount of 1 to 30 wt %.

7. A method for manufacturing an anode for a lithium secondary battery, the anode comprising an anode active substance and an imide compound, the method comprising the steps of:

dissolving said imide compound in an organic solvent;

applying said organic solvent onto said anode active substance; and evaporating said organic solvent;

wherein said imide compound is represented by the chemical formula below:

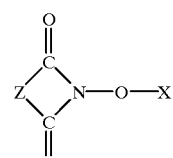

wherein Z is an optionally substituted —(CH$_2$)$_n$— (where n is an integer from 2 to 7), 1,2-cyclohexylene or 1,2-phenylene, and X is a hydrogen atom, or an optionally substituted alkyl group, aralkylcarbonyl group, alkylcarbonyl group, alkoxycarbonyl group, aralkyloxycarbonyl group, or imidyloxycarbonyl group.

8. A method for manufacturing an anode for a lithium secondary battery, the anode comprising an anode active substance and an imide compound, wherein said anode active substance is heated and melted together with said imide compound for dispersing said imide compound in said anode active substance; wherein said imide compound is presented by the chemical formula below:

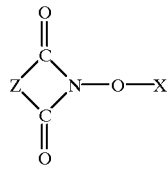

wherein Z is an optionally substituted —(CH$_2$)$_n$— (where n is an integer from 2 to 7), 1,2-cyclohexylene or 1,2-phenylene, and X is a hydrogen atom, oran optionally substituted alkyl group, aralkylcarbonyl group, alkylcarbonyl group, alkoxycarbonyl group, aralkyloxycarbonyl group, or imidyloxycarbonyl group.

9. A method for manufacturing an anode for a lithium secondary battery, the anode comprising an anode active substance and an imide compound, wherein said imide compound is applied onto the surface of an ingot containing said anode active substance when said ingot is extrusion molded; wherein said imide compound is presented by the chemical formula below:

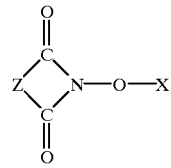

wherein Z is an optionally substituted —(CH$_2$)$_n$— (where n is an integer from 2 to 7), 1,2-cyclohexylene or 1,2-phenylene, and X is a hydrogen atom, or an optionally substituted alkyl group, aralkylcarbonyl group, alkylcarbonyl group, alkoxycarbonyl group, aralkyloxycarbonyl group, or imidyloxycarbonyl group.

* * * * *